United States Patent
Rosenblum (10) Patent No.: US 8,606,793 B1
(45) Date of Patent: Dec. 10, 2013

(54) BUSINESS METRIC SCORE FOR WEB PAGES (75) Inventor: Josh Rosenblum, Brooklyn, NY (US)

(73) Assignee: Conductor, Inc., New York, NY (US)

( * ) Notice: Subject to any disclaimer, the term of this patent is extended or adjusted under 35 U.S.C. 154(b) by 169 days.

(21) Appl. No.: 12/949,984

(22) Filed: Nov. 19, 2010

(51) Int. Cl.
*G06F 17/30* (2006.01)

(52) U.S. Cl.
USPC .......................................... 707/748

(58) Field of Classification Search
USPC .......... 707/999.107, 763, 707, 723, 735, 748
See application file for complete search history.

(56) References Cited

U.S. PATENT DOCUMENTS

| | | | |
|---|---|---|---|
| 7,877,392 B2 * | 1/2011 | Grieselhuber et al. ........ | 707/748 |
| 8,095,545 B2 * | 1/2012 | Telloli et al. ................. | 707/750 |
| 8,447,751 B2 * | 5/2013 | Stouffer et al. ............... | 707/709 |
| 8,510,262 B2 * | 8/2013 | Aggarwal et al. ............. | 707/603 |
| 2003/0208578 A1 * | 11/2003 | Taraborelli et al. ........... | 709/223 |
| 2006/0074903 A1 * | 4/2006 | Meyerzon et al. ..... | 707/999.005 |
| 2006/0287985 A1 * | 12/2006 | Castro et al. ........... | 707/999.003 |
| 2010/0049538 A1 * | 2/2010 | Frazer et al. ................. | 705/14.4 |

* cited by examiner

*Primary Examiner* — Cam-Linh Nguyen (74) *Attorney, Agent, or Firm* — Moritt Hock & Hamroff LLP; Steven S. Rubin, Esq.

(57) ABSTRACT

A system and method for generating a business metric score for a web page. The system may include a effective to receive from a user a web page, a keyword and a business metric factor. The processor may receive a search engine rank based on the web page and the keyword received from the user. The processor may apply a business metric function to the business metric factor received from the user to generate a business metric rank; and combine the search engine rank and the business metric rank to generate a business metric score.

20 Claims, 7 Drawing Sheets

BUSINESS METRIC SCORE FOR WEB PAGES

BACKGROUND OF THE INVENTION

1. Field of the Invention

This disclosure relates to a system and method for generating a business metric score for web pages reflecting a search engine rank of the web pages for a set of keywords and a business metric ranking function.

2. Description of the Related Art

Figure 1:
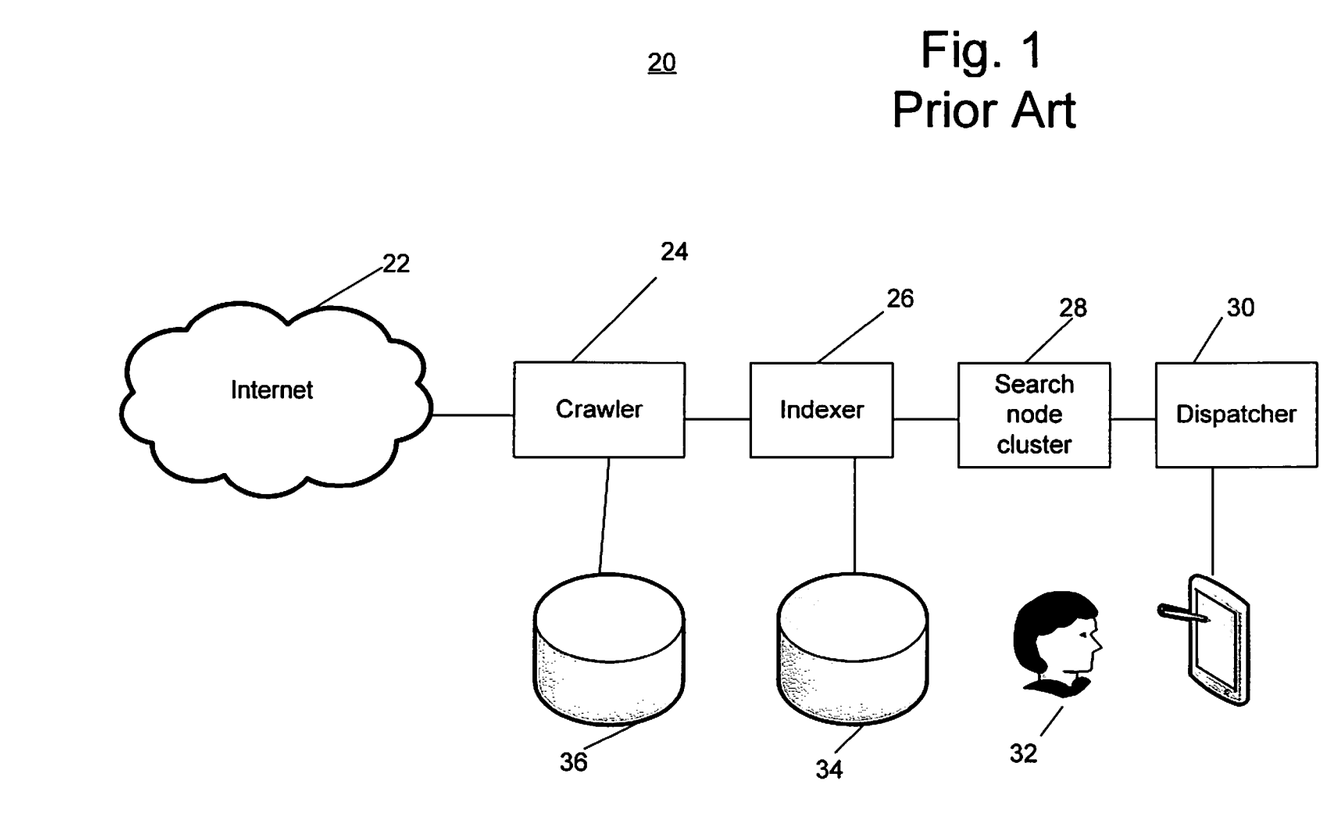
FIG. 1 is a system drawing a search engine in accordance with the prior art.

Referring to FIG. 1, the World Wide Web (WWW) is a distributed database including literally billions of pages accessible through the Internet. Searching and indexing these pages to produce useful results in response to user queries is constantly a challenge. A search engine is typically used to search the WWW.

A typical prior art search engine 20 is shown in FIG. 1. Pages from the Internet or other source 22 are accessed through the use of a crawler 24. Crawler 24 aggregates pages from source 22 to ensure that these pages are searchable. Many algorithms exist for crawlers and in most cases these crawlers follow links in known hypertext documents to obtain other documents. The pages retrieved by crawler 24 are stored in a database 36. Thereafter, these pages are indexed by an indexer 26. Indexer 26 builds a searchable index of the pages in a database 34. For example, each web page may be broken down into words and respective locations of each word on the page. The pages are then indexed by the words and their respective locations.

In use, a user 32 sends a search query to a dispatcher 30. Dispatcher 30 compiles a list of search nodes in cluster 28 to execute the query and forwards the query to those selected search nodes. The search nodes in search node cluster 28 search respective parts of the index 34 and return search results along with a document identifier to dispatcher 30. Dispatcher 30 merges the received results to produce a final result set displayed to user 32 sorted by ranking scores based on a ranking function.

For each web page, hundreds of features are extracted and a ranking function is applied to those features to produce a ranking score. A merchant with a web page would like his page to be ranked higher in a result set based on relevant search keywords compared with web pages of his competitor for the same keywords. For example, for a merchant selling telephones, that merchant would like his web page to acquire a higher ranking score, and appear higher in a result set produced by a search engine, based on the keyword query "telephone" than the ranking scores of web sites of his competitors for the same keyword.

This disclosure describes an improvement over these prior art technologies.

SUMMARY OF THE INVENTION

One embodiment of the invention is a method for generating a business metric score for a web page. The method includes receiving at a processor from a user a web page, a keyword and a business metric factor; receiving at the processor a search engine rank based on the web page and the keyword received from the user; applying by the processor a business metric function to the business metric factor received from the user to generate a business metric rank; combining by the processor the search engine rank and the business metric rank to generate a business metric score.

Another embodiment of the invention is a system for generating a business metric score for a web page. The system includes a memory; and a processor in communication with the memory and effective to receive from a user a web page, a keyword and a business metric factor; receive a search engine rank based on the web page and the keyword received from the user; apply a business metric function to the business metric factor received from the user to generate a business metric rank; combine the search engine rank and the business metric rank to generate a business metric score.

Another embodiment of the invention is a computer program device readable by a machine, tangibly embodying a program of instructions executable by the machine to perform method steps for generating a business metric score for a web page. The computer program device readable by a machine, tangibly embodying a program of instructions executable by the machine to perform method steps for generating a business metric score for a web page including receiving at a processor from a user a web page, a keyword and a business metric factor; receiving at the processor a search engine rank based on the web page and the keyword received from the user; applying by the processor a business metric function to the business metric factor received from the user to generate a business metric rank; and combining by the processor the search engine rank and the business metric rank to generate a business metric score.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Various embodiments of the invention are described hereinafter with reference to the figures. Elements of like structures or function are represented with like reference numerals throughout the figures. The figures are only intended to facilitate the description of the invention or as a limitation on the scope of the invention. In addition, an aspect described in conjunction with a particular embodiment of the invention is not necessarily limited to that embodiment and can be practiced in conjunction with any other embodiments of the invention.

When applying a ranking function, search engines receive as input: 1) at least one keyword and 2) a plurality of web pages in a result set produced based on the keyword(s). A keyword could be, for example, one or more characters, symbols and/or words. With those inputs, the search engine produces as an output a ranking score for each web page. Search engines perform the following ranking function to generate a ranking score for each page in a result set:

ranking score=$F$(input)

where the input is the search query in the form of keyword(s) and extracted features of the pages in the result set. The ranking score can be a function of more than one input.

In order to approximate the ranking function, training data may be sent to a machine learning system. Generating such training data is perhaps the most difficult and labor intensive part of any machine learning system. Data must be collected and labeled. A diverse training set is desired for a machine learning algorithm to work well.

Figure 2:
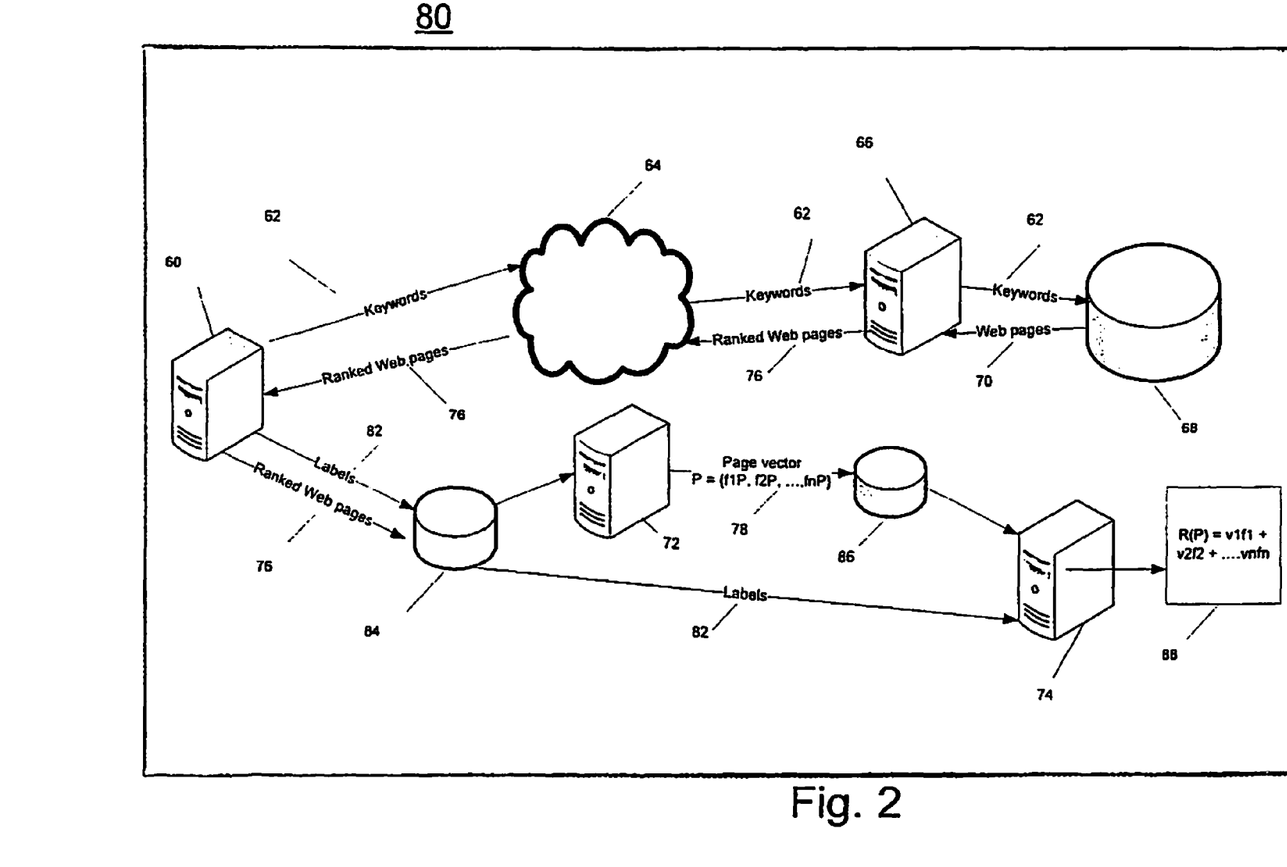
FIG. 2 is a system drawing of system for generating an approximation of a ranking algorithm in accordance with an embodiment of the invention.

Referring to FIG. 2, there is shown a system 80 for generating a ranking function. System 80 includes a training data generator server 60. Training data generator server or processor 60 sends keywords 62 over a network 64 (such as the Internet) to a search engine server 66. Keywords 62 could be virtually any set of keywords that, when input to a search engine, yield web pages in a result set. It is desirable to generate a number of different sets of keywords. Keywords 62 are sent by search engine server 66 to a search engine index 68. Search engine index 68 outputs web pages 70 that are responsive to a search query including keywords 62. Search engine server 66 receives web pages 70 and orders or ranks web pages 70 based on an unknown ranking algorithm to produce ranked web pages 76. Ranked web pages 76 are sent over network 64 and fed to training data generator server 60. Training data generator server 60 stores ranked web pages 76 and labels 82 for those pages in a training data storage 84. A label 82 is associated with each ranked web page 76 corresponding to the rank of the ranked web page 76 based on keyword 62. A feature extraction engine 72 receives web pages 76 and labels 82 from training data storage 84, and extracts values for defined features in ranked web pages 76. Search engines generate a ranking score and rank pages based on values of certain features. Those features include, for example, features used in the GOOGLE page rank algorithm (such as the links pointing to the page and links in the page pointing somewhere else), the size of the web page, the number of matches between the web page and keywords 62, etc. The features may be derived from the content and structure of HTML documents. For example the kinds of features extracted may relate to: keyword frequency in Title tag of HTML documents, keyword frequency in metatags of HTML documents, keyword frequency in the body of HTML documents, keyword frequency in anchor text of in-links to a HTML document, number of back links of a HTML document, or distribution of back links of HTML documents. If n features are extracted from ranked web pages 76, then each page P may be represented as a page vector 78 P={f1P, f2P, . . . fnP} where fnP is the nth feature of page P.

Approximated ranking function 88 need not be the same as the actual ranking algorithm used by search engine server 66 to be of significant value. For example, the GOGGLE search engine may assign different weights to different features than those assigned by machine learning server 74. In fact, machine learning server 74 may identify new patterns and/or useful features not currently appreciated by known search engines. However, as the inputs to machine learning server 74 (e.g. page vectors 78 and labels 82) are the outputs of a search engine of interest, approximated ranking function 88 yields a valuable result. Ranking function 88 may be used to evaluate how well a particular web page would rank in a result set based on a keyword in a search engine of interest.

Armed with the above information, a user may be able to present the system with a web site, a search engine of interest, and pertinent keywords and receive a score indicating how well the web site is designed for that search engine based on the keywords. Unfortunately, this score indicates only one portion of the overall picture when attempting to predict a profitability of a particular web page, that is, predicting an economic value of persons visiting a particular web page.

The inventor(s) has/have determined that in order to more accurately predict the number of people that will visit a particular web page a user should be provided with a business metric score for web pages that reflects not only a search engine rank of the web pages for an arbitrary set of keywords, but also reflects the application of a business metric ranking function. The business metric ranking function can enhance the search engine rank by incorporating business metric factors that are relevant to a particular business to generate a final business metric score. For example, the business metric function can include such factors as demographics of a business's customers including a geographic location of potential customers, search volume of a keyword, popularity of a particular web page, etc. The demographics are not limited to factors such as age, gender, race, but can include search profile demographics, i.e. an indication of people who tend to click onto a particular site. These types of online behavior related demographics can lead to indications of profitability of a web page.

In addition, when generating a ranking score for multiple web pages, it is more advantageous to provide the user with a holistic ranking score that accounts for such factors as relationships between web pages, number of clicks between web pages, relative number of links between one web page and another web page considered more important to the user, etc. This holistic approach to generating a score provides a user with a final business metric score with intrinsic business objectives geared to web site design.

Figure 3:
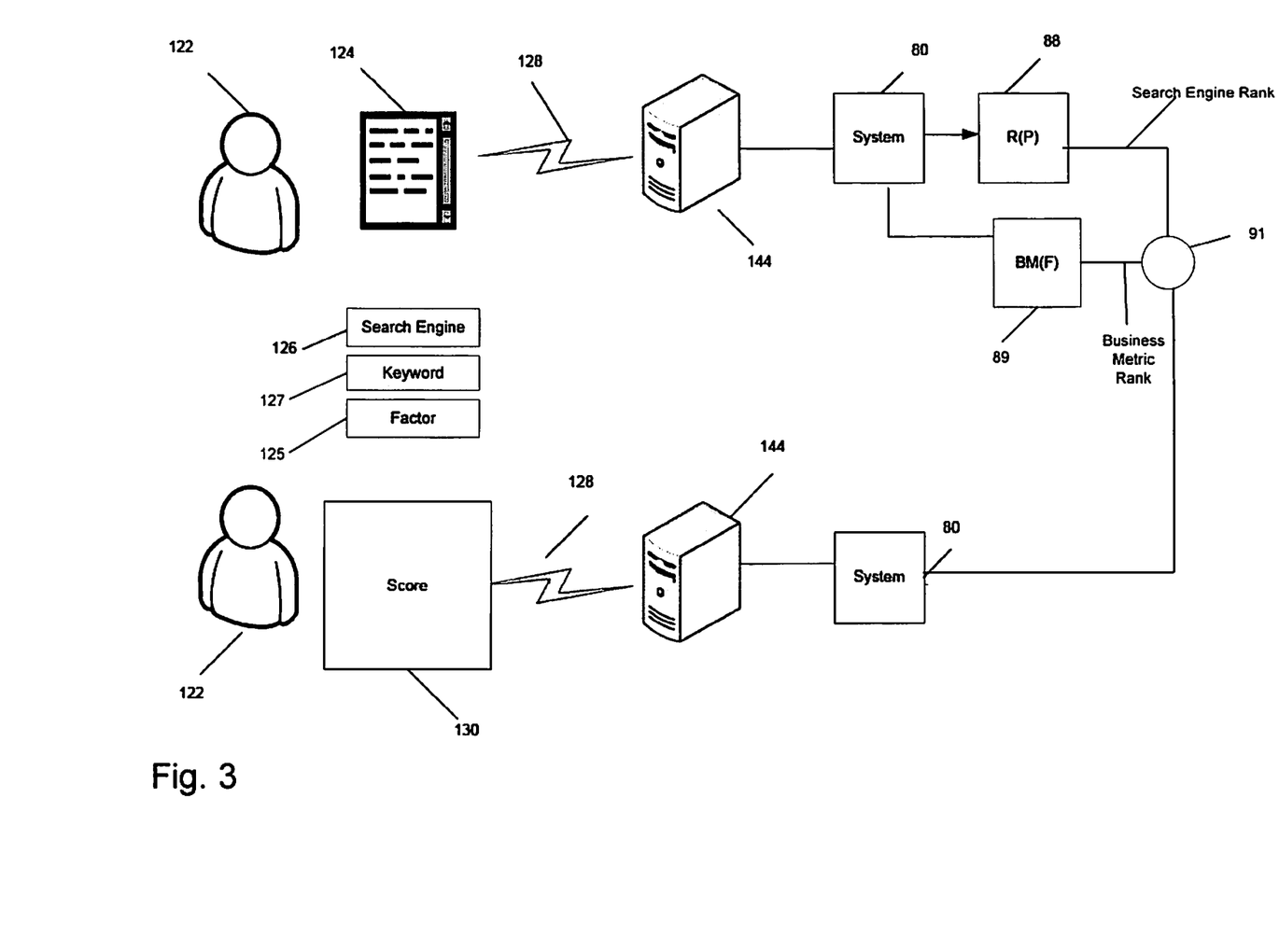
FIG. 3 is a system drawing of a system for generating a score for a web page in accordance with an embodiment of the invention.

For example, as shown in FIG. 3, system 80 may receive a web page 124, an indication of a desired search engine 126, pertinent keywords 127, and a business metric factor 125 from a user 122, such as through a communication 128, at a receiving server/processor 144. Web page 124, indication of a desired search engine 126, pertinent keywords 127, and business metric factor 125 can be received from a user. More than one factor 125 can be received. System 80 can receive a search engine rank based on the web page 124 and keyword 127. System 80 can determine an approximated ranking function 88 for search engine 126 using techniques described above.

In addition, system 80 receives the business metric factors 125 and can apply the business metric function 89 to the business metric factors 125 to generate a business metric rank. The business metric function 89 will be described in more detail below. The search engine rank and business metric rank are then combined in engine 91 to produce business metric score 130. Business metric score 130 may then be forwarded to user 122. Business metric score 130 not only provides user 122 with a measure of how well web page 124 is ranking in search engine algorithms for keywords 127. Business metric score 130 also provides user 122 with a score enhanced by business metric factors 125, and, in particular, can indicate not only how well web page 124 would rank in search engine 126, but also can indicate how many people might visit the web page 124.

Business metric function 89 BM(F) can be determined by the following:

$$BM(F) = w1x1 + w2x2 \ldots + wnxn$$

where x1 . . . xn represents factors 1 . . . n and w1 . . . wn are weights applied to factors x1 . . . xn, respectively. In operation, user 122 can begin with a business objective, e.g. selling sneakers. User 122 can determine factors 125 that apply to the business objective. System 80 can provide user 122 with a list of factors 125 from which to select.

For example, user 122 can determine that to achieve the business objective, i.e. selling sneakers, the web page 124 needs to be targeted to a certain target demographic (e.g. men, 30-35 years of age, living in the northeast). In addition, user 122 can determine that keywords "sneakers" and "athletic shoes" are both important to the business objective. The target demographic and important keywords are examples of factors 125. These factors 125 can be selected from a plurality of factors provided by system 80 to user 122. User 122 transmits factors 125 to system 80. System 80 can receive factors 125 and apply business metric function 89 to factors 125.

With respect to the target demographics, system 80 can retrieve from a database business demographic keywords generated for the target demographic based on known profiles. For example, a web analytics service like COMSCORE, and/or a search engine like GOOGLE, may provide data regarding the types of keywords users of particular demographics typically generate. For example, such data may indicate the keywords typically generated by a man, 30-35 years of age, living in the northeast. System 80 can receive a business demographic keyword relating to the business demographic, can receive a search engine rank based on the web page and the business demographic keyword, and can apply the business metric function to the search engine rank based on the web page and the business demographic keyword to generate the business metric rank.

System 80 can apply business metric function 89 to factors 125, e.g. the target demographic. The application of business metric function 89 to factors 125 can be tailored for each user 122. That is, factors 125 can be given different weights based on the business needs of user 122. For example, the weights applied to factors 125 for an automotive business can be different than the weights applied to factors 125 for a sneaker business. System 80 can combine business metric rank and search engine rank in engine 91 to produce business metric score 130. Engine 91 combines business metric rank and search engine rank based on a known math function. The combination may be tailored for each user and/or business. For example, for each business vertical, engine 91 may weigh the business metric rank and search engine rank in a particular manner. As described above, system 80 can apply web page 124, keywords 127 and/or factors 125 to business metric ranking function 90 to produce business metric score 130 for web page 124, keywords 127 and factors 125.

Figure 4:
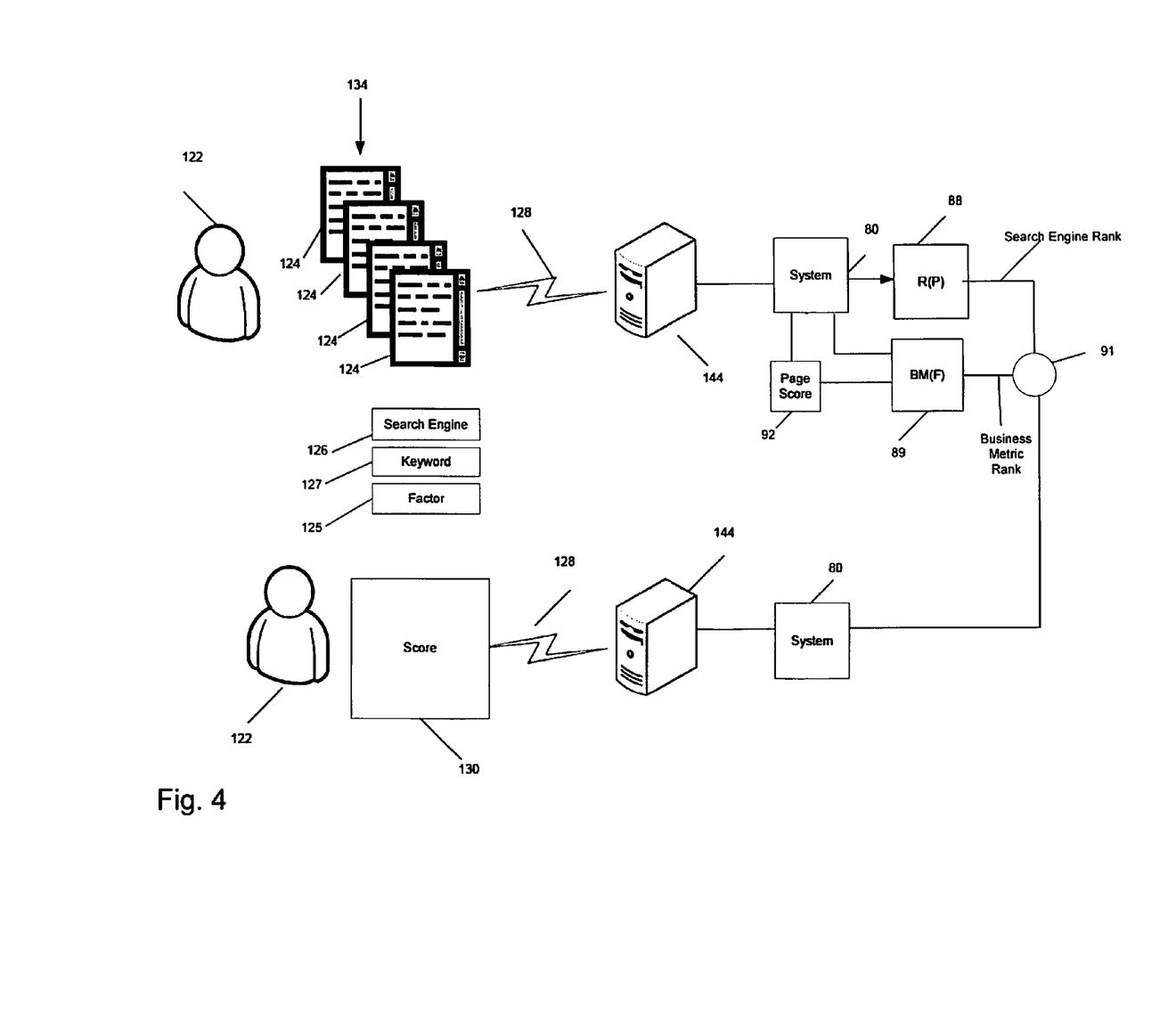
FIG. 4 is a system drawing of a system for generating a score for a web site in accordance with an embodiment of the invention.

Referring to FIG. 4, a web site 134 may include a plurality of web pages 124. A site score may be generated for web site 134 by averaging scores for the web pages 124 across web site 134. For example, a Site Score SS may be calculated as $$((w1s1+w2s2 \ldots +wnsn)/(w1+w2 \ldots +wn))$$

where wn is the weight of the nth page of the web site 134, and sn is the score of the nth page using score 130 discussed above. Weights w can be assigned based on the popularity of each page in the web site. Site Score SS thus represents a numerical measure of how well an entire web site is faring in search engines. Site Score SS can provide information about a web site as a whole.

The inventor(s) has/have determined that a site score alone can limit the analysis of a web site. Applying a more holistic approach to the analysis of how web pages of a web site relate to each other can be a valuable analysis tool to users. In addition, even though the holistic approach is described herein as being applied to the web pages of a web site, the holistic approach is equally applicable to any of a plurality of web pages.

Returning again to FIG. 4, the plurality of web pages 124 of web site 134 are received by receiving server 144 from user 122. The inventors have determined that each web page 124 can be compared to other web pages 124 in web site 134 and produce a page score 92 for a particular web page 124. The page score 92 for particular web page 124 can be used to analyze how well a web site 134 is designed, or how well one web page 124 interacts with another web page 124.

For example, web site 134 includes 4 web pages 124 (denoted herein as web page a, web page b, web page c, and web page d, for this example). Each web page can receive a score based on number of clicks or links required to get from one web page to another web page and/or number of total web pages from which to select a particular web page. These values provide a basis to determine the page score for each web page 124. The page score can be used to optimize one web page, e.g. web page a, with respect to another web page, e.g. web page b.

For example, user 122 can send a plurality of web pages 124, an indication of a search engine 126, keyword 127 and factors 125 to receiving server 144. System 80 can receive a search engine rank based on keyword 127 and web page 124. System 80 can apply business metric function 89 to factors 125. Engine 91 can combine search engine rank and business metric rank to produce business metric score 130. System 80 can generate a business metric score 130 for each web page 124.

After the web pages 124 are received by receiving server 144, system 80 can analyze relationships among the web pages 124. System 80 can generate a page score 92 for each of web pages 124 based on the analysis. A comparison of page scores 92 can be a useful tool in optimizing web pages 124. In addition, system 80 can combine the page scores 92 to generate an enhanced site score that takes into account the relations between web pages 124. System 80 can send page score 92 to user 122.

Figure 5:
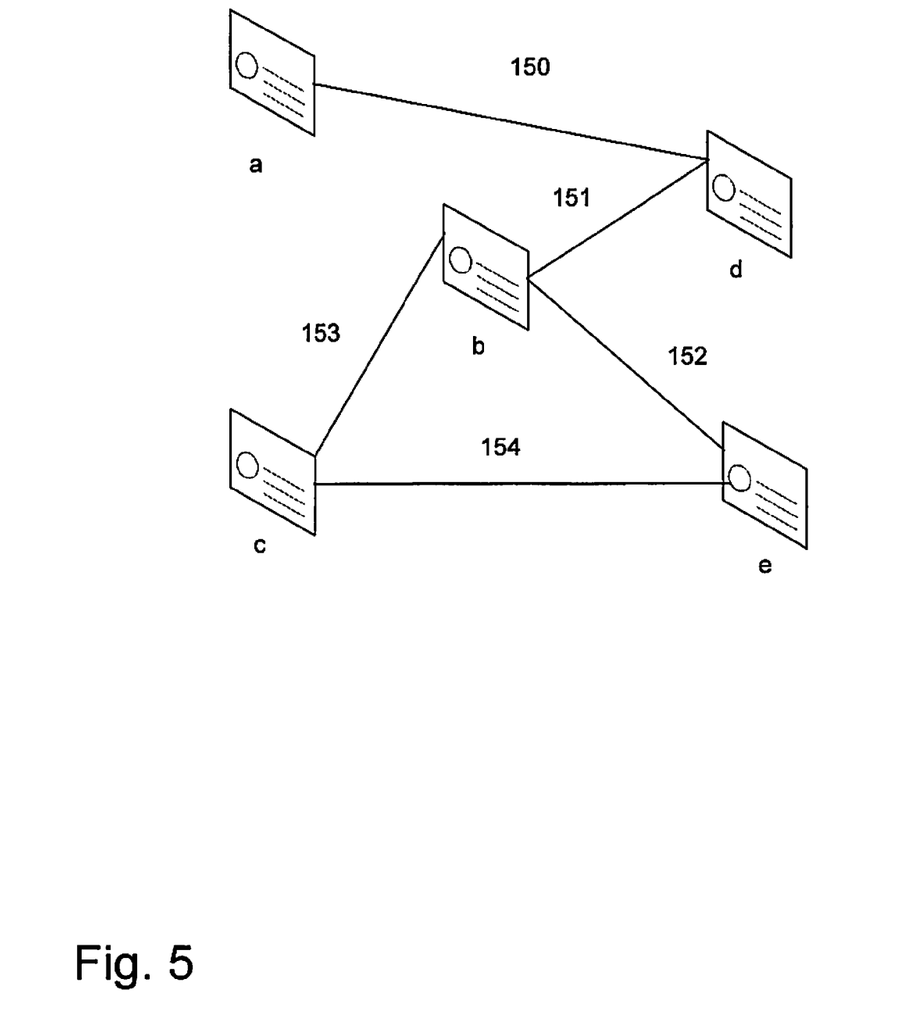
FIG. 5 is a drawing illustrating an example of a web page analysis in accordance with an embodiment of the invention.

Referring to FIG. 5, the analysis between web pages 124 can be based on various relationships among web pages 124. For example, among web page a through web page e shown in FIG. 5, system 80 can determine links 150-154 linking web pages a-e. As shown, web page a is linked to only web page d, whereas web page b is linked to web pages c, d and e, and web page c is linked to web pages b and e. User 122 can identify a particular web page from web pages 124. In this example, user 122 identifies web page e as a particular web page. If a random user begins at web page a, in order for the random user to get to web page e, the random user would need to navigate through web pages d and b to arrive at web page e. If a random user begins at web page c, in order for the random user to get to web page e, the random user would need only to navigate directly to web page e. Thus, while generating page score 92, system 80 can determine then number of clicks or links between web page a and web page e is 3, and the number of clicks between web page c and web page e is 1. Thus, web page c provides better access to web page e and receives a higher page score 92 than web page a. System 80 can generate page score 92 for web page c and page score 92 for web page a based on this analysis. Page score 92 for web page c would be higher than and page score 92 for web page a. System 80 can include page score 92 as a factor 125 when applying business metric function 89 to factors 125.

Figure 6:
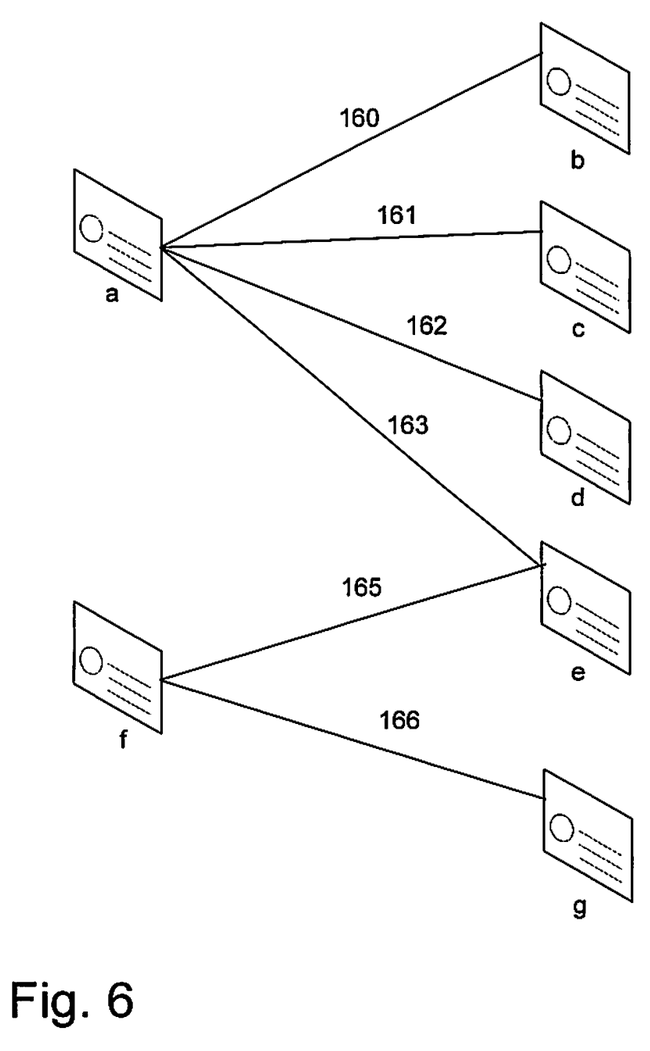
FIG. 6 is a drawing illustrating another example of a web page analysis in accordance with an embodiment of the invention.

Referring to FIG. 6, the analysis between web pages 124 can be based on other relationships among web pages 124. For example, user 122 can select web page e as a particular web page of interest. System 80 can determine the number of links 160-166 from web pages a and f to particular web page e. As shown, web page a is connected to web pages b-e, and web page f is connected to web pages e and g. In this example, user 122 identifies web page e as a particular web page. If a random user begins at either web page a or f, in order for the random user to get to web page e, the random user could navigate directly to web page e from either of web page a or f. Although this is true, random user is presented with more choices from web page a, i.e. web page e being 1 of 4 choices, than from web page f, i.e. web page e being 1 of 2 choices. Web page f provides better access to web page e based on the number of choices to web page e. Thus, based on the analysis, system 80 can generate page score 92 for web page f and page score 92 for web page a. Page score 92 for web page f would be higher than page score 92 for web page a. System 80 can apply page score 92 to business metric function 89 to produce business metric score 130.

In addition, the analysis shown in of FIGS. 5 and 6 can be combined. By analyzing the web pages as such, system 80 can provide user 122 with valuable analysis information through the pages score 92 and business metric score 130.

Figure 7:
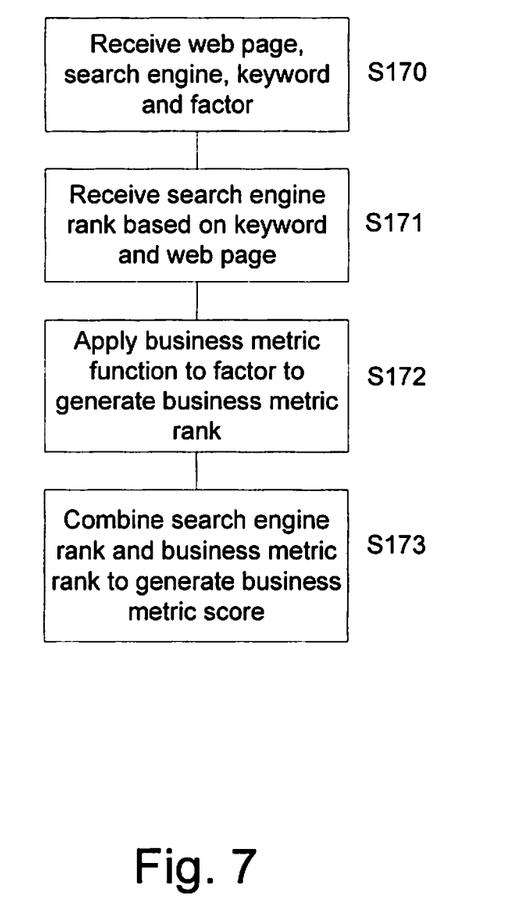
FIG. 7 is a flow chart of a process which could be used in accordance with an embodiment of the invention.

FIG. 7 is a flowchart of a process which could be used in accordance with an embodiment of the invention. In step S170, system 80 receives a web page, search engine, keyword and business metric factor. In step S171, system 80 receives a search engine rank based on the keyword and the web page. In step S172, system 80 applies the business metric function to the factor to generate the business metric rank. In step S173, system 80 combines the search engine rank and the business metric rank to generate the business metric score.

Clearly, although different servers are shown for various elements such as the training data server, and the feature extraction server, the receiving server, and the prediction/recommendation server, all servers could be combined in a single processor, housing or location. A system in accordance with the invention could analyze one page or thousands of pages easily and efficiently.

The invention has been described with reference to an embodiment that illustrates the principles of the invention and is not meant to limit the scope of the invention. Modifications and alterations may occur to others upon reading and understanding the preceding detailed description. It is intended that the scope of the invention be construed as including all modifications and alterations that may occur to others upon reading and understanding the preceding detailed description insofar as they come within the scope of the following claims or equivalents thereof. Various changes may be made without departing from the spirit and scope of the invention.

What is claimed is:

1. A method for generating a business metric score for a web page, the method comprising:
   receiving at a processor from a user a web page, a keyword and a business metric factor;
   receiving at the processor a search engine rank based on the web page and the keyword received from the user;
   applying by the processor a business metric function to the business metric factor received from the user to generate a business metric rank; and
   combining by the processor the search engine rank and the business metric rank to generate a business metric score for the web page.

2. The method of claim 1, wherein the web page is a first web page, the business metric factor is an indication of a second web page, and applying the business metric function to the business metric factor comprises:
   receiving by the processor from the user the second web page and a third web page;
   analyzing by the processor relationships between the first, second and third web pages to generate a page score for the first web page; and
   applying the business metric function to the page score to generate the business metric rank.

3. The method of claim 2, wherein analyzing the relationships comprises:
   determining a number of clicks to navigate to the second web page from the first web page and from the third web page; and
   generating the page score based on the number of clicks.

4. The method of claim 3, wherein analyzing the relationships comprises:
   determining a number of links from the first web page and from the third web page to the second web page; and
   generating the page score based on the number of links.

5. The method of claim 1, wherein the business metric factor is a business demographic, and applying the business metric function to the business metric factor comprises:
   receiving by the processor a business demographic keyword relating to the business demographic;
   receiving by the processor a search engine rank based on the web page and the business demographic keyword; and
   applying the business metric function to the search engine rank based on the web page and
   the business demographic keyword to generate the business metric rank.

6. The method of claim 1, wherein applying the business metric function to the business metric factor comprises receiving by the processor a keyword search volume based on the keyword, wherein the business metric function includes the keyword search volume.

7. The method of claim 1, wherein the business metric factor is selected by the user from a list provided by the processor.

8. The method of claim 1, wherein
   the business metric factor is a business demographic, and
   applying the business metric function to the business metric factor comprises
      receiving by the processor a business demographic keyword relating to the business demographic,
      receiving by the processor a search engine rank based on the web page and the business demographic keyword,
      applying the business metric function to the search engine rank based on the web page and the business demographic keyword to generate the business metric rank,
      receiving by the processor a keyword search volume based on the keyword, wherein the business metric function includes the keyword search volume, and
   wherein the business metric factor is selected by the user from a list provided by the processor.

9. The method of claim 4, wherein
   the business metric factor is a business demographic, and
   applying the business metric function to the business metric factor comprises
      receiving by the processor a business demographic keyword relating to the business demographic,
      receiving by the processor a search engine rank based on the web page and the business demographic keyword,
      applying the business metric function to the search engine rank based on the web page and the business demographic keyword to generate the business metric rank, receiving by the processor a keyword search volume based on the keyword, wherein the business metric function includes the keyword search volume, and wherein the business metric factor is selected by the user from a list provided by the processor.

10. A system for generating a business metric score for a web page, the system comprising:

a memory; and a processor in communication with the memory and effective to receive from a user a web page, a keyword and a business metric factor;

receive a search engine rank based on the web page and the keyword received from the user;

apply a business metric function to the business metric factor received from the user to generate a business metric rank;

combine the search engine rank and the business metric rank to generate a business metric score for the web page.

11. The system of claim 10, wherein the web page is a first web page, the business metric factor is an indication of a second web page, and the processor is effective to apply the business metric function to the business metric factor by being effective to:

receive from the user the second web page and a third web page;

analyze relationships between the first, second and third web pages to generate a page score for the first web page; and apply the business metric function to the page score to generate the business metric rank.

12. The system of claim 10, wherein the processor is effective to analyze the relationships by being effective to:

determine a number of clicks to navigate to the second web page from the first web page and from the third web page; and generate the page score based on the number of clicks.

13. The system of claim 12, wherein the processor is effective to analyze the relationships by being effective to:

determine a number of links from the first web page and from the third web page to the second web page; and generate the page score based on the number of links.

14. The system of claim 10, wherein the business metric factor is a business demographic, and the processor is effective to apply the business metric function to the business metric factor by being effective to:

receive a business demographic keyword relating to the business demographic;

receive a search engine rank based on the web page and the business demographic keyword; and apply the business metric function to the search engine rank based on the web page and the business demographic keyword to generate the business metric rank.

15. The system of claim 10, wherein the processor is effective to apply the business metric function to the business metric factor by being effective to receive a keyword search volume based on the keyword, wherein the business metric function includes the keyword search volume.

16. The system of claim 10, wherein the business metric factor is selected by the user from a list provided by the processor.

17. The system of claim 10, wherein the business metric factor is a business demographic, and the processor is effective to apply the business metric function to the business metric factor by being effective to receive a business demographic keyword relating to the business demographic, receive a search engine rank based on the web page and the business demographic keyword, apply the business metric function to the search engine rank based on the web page and the business demographic keyword to generate the business metric rank, receive a keyword search volume based on the keyword, wherein the business metric function includes the keyword search volume, and wherein the business metric factor is selected by the user from a list provided by the processor.

18. The system of claim 13, wherein the business metric factor is a business demographic, and the processor is effective to apply the business metric function to the business metric factor by being effective to receive a business demographic keyword relating to the business demographic, receive a search engine rank based on the web page and the business demographic keyword, apply the business metric function to the search engine rank based on the web page and the business demographic keyword to generate the business metric rank, receive a keyword search volume based on the keyword, wherein the business metric function includes the keyword search volume, and wherein the business metric factor is selected by the user from a list provided by the processor.

19. A computer program device readable by a machine, tangibly embodying a program of instructions executable by the machine to perform method steps for generating a business metric score for a web page, comprising:

receiving at a processor from a user a web page, a keyword and a business metric factor;

receiving at the processor a search engine rank based on the web page and the keyword received from the user;

applying by the processor a business metric function to the business metric factor received from the user, the business metric function including applying a weight to the business metric factor, to generate a business metric rank; and combining by the processor the search engine rank and the business metric rank to generate a business metric score for the web page.

20. The computer program device readable by a machine, tangibly embodying a program of instructions executable by the machine of claim 19, wherein the factor is selected by the user from a list provided by the processor.

* * * * *